(12) United States Patent
Plamondon et al.

(10) Patent No.: US 12,265,000 B2
(45) Date of Patent: Apr. 1, 2025

(54) DIAGNOSTIC SYSTEM AND METHOD FOR MONITORING HYDRAULIC PUMP

(71) Applicant: THE BOEING COMPANY, Chicago, IL (US)

(72) Inventors: Morgan M. Plamondon, Mukilteo, WA (US); Zachary Malbin, Langley, WA (US)

(73) Assignee: THE BOEING COMPANY, Chicago, IL (US)

( * ) Notice: Subject to any disclaimer, the term of this patent is extended or adjusted under 35 U.S.C. 154(b) by 301 days.

(21) Appl. No.: 17/965,922

(22) Filed: Oct. 14, 2022

(65) Prior Publication Data

US 2024/0125674 A1    Apr. 18, 2024

(51) Int. Cl.
*B64D 45/00* (2006.01)
*F15B 19/00* (2006.01)
*G01M 99/00* (2011.01)

(52) U.S. Cl.
CPC ........... *G01M 99/002* (2013.01); *B64D 45/00* (2013.01); *F15B 19/00* (2013.01); *G01M 99/007* (2013.01); *B64D 2045/0085* (2013.01)

(58) Field of Classification Search
CPC .. G01M 99/002; G01M 99/007; B64D 45/00; B64D 2045/0085; F15B 19/00; F15B 2211/2053; F15B 2211/6343; F15B 2211/857; F15B 19/005; F15B 21/042; F04B 2203/0209; F04B 2205/10; F04B 2205/11; F04B 49/065; F04B 49/20; F04B 51/00; B64F 5/60
See application file for complete search history.

(56) References Cited

U.S. PATENT DOCUMENTS

2020/0340504 A1* 10/2020 Chung ................. F15B 21/041
2023/0174222 A1*  6/2023 Hagihara ................ B64C 25/28
                                                                    244/102 A

FOREIGN PATENT DOCUMENTS

WO    2015153727 A2    10/2015
WO    2020180923 A1     9/2020
WO    2021186808 A1     9/2021

OTHER PUBLICATIONS

Extended European Search Report for related EP App No. 23193110.6 dated Jan. 31, 2024 (8 pages).

* cited by examiner

*Primary Examiner* — Ashley L Redhead, Jr.
(74) *Attorney, Agent, or Firm* — The Small Patent Law Group LLC; Philip S. Hof

(57) ABSTRACT

A system and method include a hydraulic system onboard an aircraft, a first temperature sensor, a second temperature sensor, and a controller. The first temperature sensor measures a first temperature of hydraulic fluid upstream of an inlet of a pump of the hydraulic system. The second temperature sensor measures a second temperature of the hydraulic fluid within a cooling flow stream downstream of an outlet of the pump. The controller determines a value of a temperature rise of the hydraulic fluid across the pump as a difference between the first temperature and the second temperature, and obtains an expected range for the temperature rise across the pump based on a speed of the pump. In response to the value of the temperature rise being outside of the expected range, the controller generates a maintenance message for communication off-board the aircraft, indicating the pump is degraded.

20 Claims, 5 Drawing Sheets

| Pump Speed (rpm) | Expected temp. rise lower limit | Expected temp. rise upper limit |
|---|---|---|
| 1000 to 2000 | 7 | 12 |
| 2001 to 3000 | 9 | 17 |
| 3001 to 4000 | 12 | 22 |
| 4001 to 5000 | 16 | 25 |
| 5001 to 6000 | 19 | 28 |
| 6001 to 7000 | 21 | 31 |

Reservoir Temperature Range 20 to 80 F

DIAGNOSTIC SYSTEM AND METHOD FOR MONITORING HYDRAULIC PUMP

FIELD OF THE DISCLOSURE

Embodiments of the present disclosure generally relate to hydraulic systems in aircraft.

BACKGROUND OF THE DISCLOSURE

Aircraft hydraulic systems are used to move flight control surfaces, landing gears, thrust reversers, and the like. Hydraulic systems are also used to control the aircraft in flight. Hydraulic pumps provide a source of hydraulic power for the hydraulic system through powered compression of an incompressible hydraulic fluid. Hydraulic pumps can convert mechanical energy power from various power sources present on the aircraft, such as aircraft engines, electric motors, ram air turbines, and pneumatic systems.

Hydraulic pumps are conventionally operated until failure. Failed pumps may cause service disruptions because a scheduled flight may be delayed, canceled, or diverted in order to perform the unscheduled maintenance of replacing the failed pump. Beyond service disruptions, some failure modes can damage components of the aircraft, increasing the expense and time required to correct the failure. Known fault monitoring for hydraulic pumps is limited to detection of pump or system overheat conditions based on a monitored temperature exceeding a high temperature overheat threshold. The overheat threshold may be set at a very high value due to variability of the system and environmental factors (such as ambient temperature) to limit false positive detections of overheat conditions. Pumps may degrade well prior to reaching the overheat condition. A degraded pump may have issues, such as lower flow rates, no flow on start-up, may operate intermittently, may fail to produce pressure, and/or the like. The high overheat thresholds do not allow for early detection of pump issues.

SUMMARY OF THE DISCLOSURE

A need exists for a diagnostic system and methods to provide early detection of degraded hydraulic pumps prior to pump failure, which would enable scheduled maintenance to address a degraded, though still operable, pump to avoid aircraft service disruptions and pump failures.

With those needs in mind, certain embodiments of the present disclosure provide a diagnostic system that includes a hydraulic system onboard an aircraft, a first temperature sensor, a second temperature sensor, and a controller including one or more processors. The hydraulic system includes a pump configured to pump hydraulic fluid from a reservoir to a hydraulic load on the aircraft. The first temperature sensor is configured to measure a first temperature of the hydraulic fluid upstream of an inlet of the pump. The second temperature sensor is configured to measure a second temperature of the hydraulic fluid within a cooling flow stream downstream of an outlet of the pump. The controller is configured to determine a value of a temperature rise of the hydraulic fluid across the pump as a difference between the first temperature and the second temperature. The controller is configured to obtain an expected range for the temperature rise of the hydraulic fluid across the pump based on a speed of the pump. In response to the value of the temperature rise being outside of the expected range, the controller is configured to generate a maintenance message for communication to one or more devices that are off-board the aircraft. The maintenance message indicates that the pump is operating in a degraded state.

Certain embodiments of the present disclosure provide a method for monitoring a condition of a hydraulic pump. The method includes determining a value of a temperature rise of hydraulic fluid across a pump of a hydraulic system onboard an aircraft. The temperature rise is determined between a first temperature of the hydraulic fluid measured upstream of an inlet of the pump and a second temperature of the hydraulic fluid measured within a cooling flow stream downstream of an outlet of the pump. The method includes obtaining an expected range for the temperature rise of the hydraulic fluid across the pump based on a speed of the pump. In response to the value of the temperature rise being outside of the expected range, the method includes generating a maintenance message for communication to one or more devices that are off-board the aircraft. The maintenance message indicates that the pump is operating in a degraded state.

Certain embodiments of the present disclosure provide a diagnostic system that includes a first temperature sensor, a second temperature sensor, and a controller including one or more processors. The first temperature sensor is configured to measure a first temperature of hydraulic fluid upstream of an inlet of a pump. The hydraulic fluid and the pump represent components of a hydraulic system onboard an aircraft. The pump is configured to pump the hydraulic fluid from a reservoir to a hydraulic load on the aircraft. The second temperature sensor is configured to measure a second temperature of the hydraulic fluid within a cooling flow stream downstream of an outlet of the pump. The controller is configured to detect a flight condition of the aircraft based, at least in part, on an absence of control signals received from a user input device that controls movement of the aircraft. The controller is configured to determine a value of a temperature rise of the hydraulic fluid across the pump as a difference between the first temperature and the second temperature. The value of the temperature rise is determined while the aircraft is in the flight condition that is detected. The controller is configured to obtain an expected range for the temperature rise of the hydraulic fluid across the pump based on the flight condition of the aircraft and a speed of the pump. In response to the value of the temperature rise being outside of the expected range, the controller is configured to generate a maintenance message for communication to one or more devices that are off-board the aircraft. The maintenance message identifies the pump, indicates that the pump is operating in a degraded state, and requests scheduling a maintenance appointment for the aircraft.

BRIEF DESCRIPTION OF THE DRAWINGS

These and other features, aspects, and advantages of the present disclosure will become better understood when the following detailed description is read with reference to the accompanying drawings in which like numerals represent like parts throughout the drawings, wherein.

DETAILED DESCRIPTION OF THE DISCLOSURE

The foregoing summary, as well as the following detailed description of certain embodiments will be better understood when read in conjunction with the appended drawings. As used herein, an element or step recited in the singular and preceded by the word "a" or "an" should be understood as not necessarily excluding the plural of the elements or steps. Further, references to "one embodiment" are not intended to be interpreted as excluding the existence of additional embodiments that also incorporate the recited features. Moreover, unless explicitly stated to the contrary, embodiments "comprising" or "having" an element or a plurality of elements having a particular condition can include additional elements not having that condition.

Examples of the present disclosure provide a diagnostic system that provides early detection of degraded hydraulic pumps. The early detection refers to detecting a degraded pump before a temperature associated with the pump exceeds a high temperature overheat threshold or another condition indicating pump failure is detected. The system and method described herein may detect a degraded hydraulic pump while the pump is operational, prior to failing. For example, a degraded pump may have reduced performance characteristics relative to a healthy pump, such as providing a lower flow rate, lower pressure, fluctuating flow rate and/or pressure, intermittent issues, and/or the like. A degraded pump is still operational, as the performance characteristics are sufficient to satisfy a baseline functional criteria. Pumps that fail to satisfy the baseline functional criteria are referred to as failed pumps, and are not operational. Failed pumps may trigger a fault or failure mode, such as when a temperature rise across the pump exceeds a high temperature overheat threshold or the pump fails to produce output flow. The early detection of degraded pumps provided by the system and method allows for scheduling maintenance to address (e.g., repair or replace) degraded pumps at a convenient time to avoid aircraft service disruptions. For example, a degraded pump may be replaced during a normal scheduled maintenance event for the aircraft, before the pump fails. Furthermore, the diagnostic system and method described herein may use devices present on the aircraft and introduce new aircraft failure modes, without requiring additional devices that would increase cost and add weight.

Figure 1:
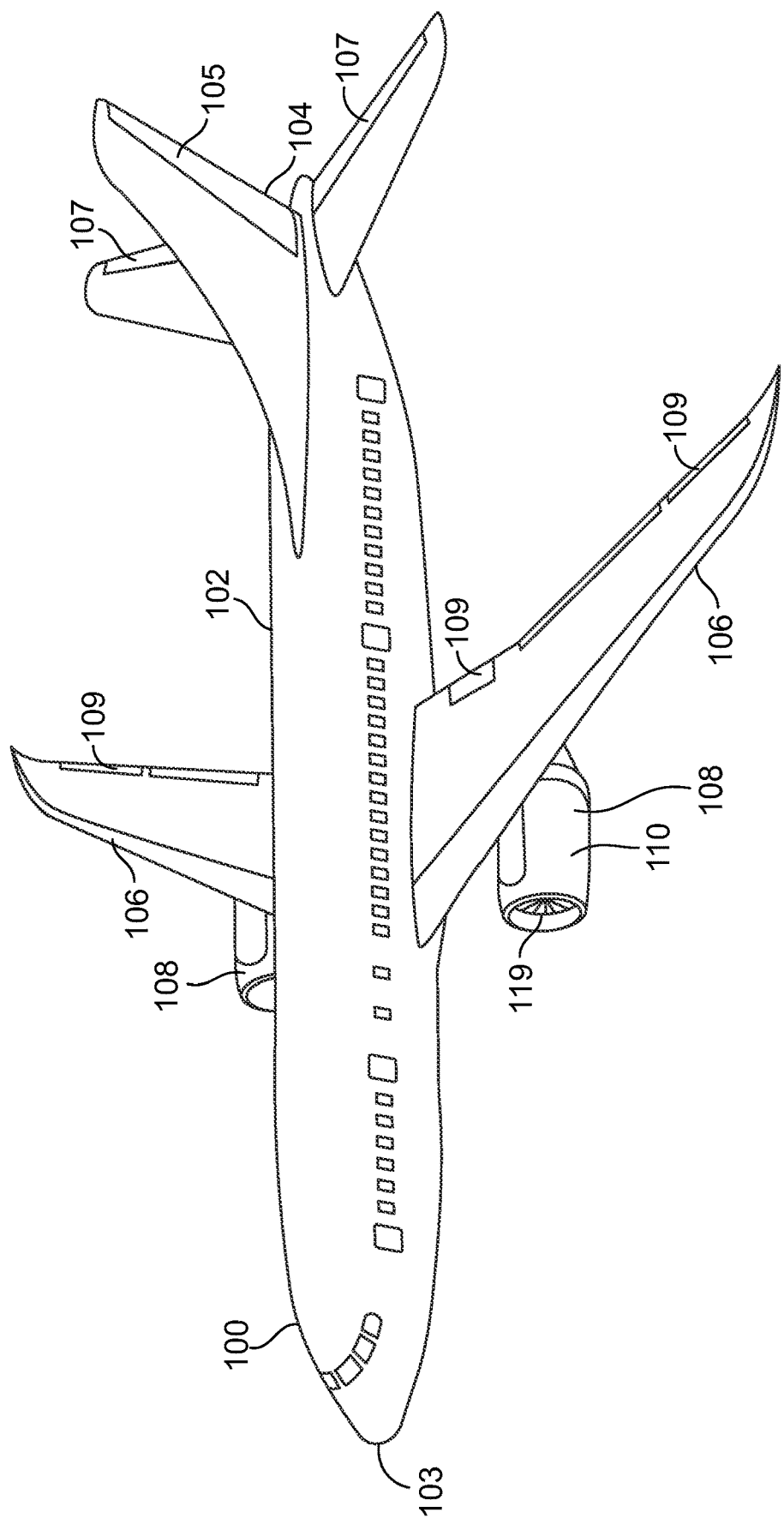
FIG. 1 is a perspective illustration of an aircraft.

FIG. 1 is a perspective illustration of an aircraft 100. The aircraft 100 may include a fuselage 102 extending from a nose 103 to an empennage 104. The empennage 104 (or tail) may include movable tail surfaces, such as a rudder 105 and elevators 107, for directional control of the aircraft 100. The aircraft 100 includes a pair of wings 106 extending from the fuselage 102. The wings 106 may include movable wing surfaces 109, such as ailerons, flaps, and/or spoilers. One or more propulsion systems 108 propel the aircraft 100. The propulsion systems 108 are supported by the wings 106 of the aircraft 100, but may be mounted to the fuselage 102 or empennage 104 in other types of aircraft. Each propulsion system 108 includes a rotor assembly 119 with rotors that spin to direct air and a nacelle 110. The nacelle 110 is an outer casing or housing that holds and surrounds the rotor assembly 119. The rotor assembly 119 may be a portion of a gas turbine engine, which burns a fuel, such as gasoline or kerosene, to generate thrust for propelling the aircraft 100. In an alternative embodiment, the rotor assemblies 119 of some of all of the propulsion systems 108 may be driven by electrically-powered motors, rather than by the combustion of fuel within a gas turbine engine. For example, the motors of such propulsion systems 108 may be electrically-powered by an onboard electrical energy storage device (e.g., a battery system) and/or an onboard electrical energy generation system.

The aircraft 100 may include a hydraulic system that uses hydraulic fluid to control movement and positioning of mechanical aircraft components necessary for safe, controlled flight of the aircraft. The hydraulics may produce steering, braking, thrust reverser control, and/or the like for on-board or on-ground control of the aircraft. For example, flight control surfaces (e.g., rudder 105, elevators 107, movable wing surfaces 109) for steering the aircraft, landing gears, thrust reversers, and/or the like may be controlled via the flow of hydraulic fluid. The hydraulic system may be controlled based on control signals generated by a user input device that controls movement and operations of the aircraft. The user input device may be operated by a pilot or co-pilot. Optionally, the hydraulic system may be controlled by control signals generated by an automated system, such as an autopilot system or autonomous flight system.

The diagnostic system and method described herein is directed to monitoring the condition (or health) of pumps of aircraft hydraulic systems. The entire diagnostic system may be disposed onboard the aircraft 100. Alternatively, a first portion of the diagnostic system may be onboard the aircraft 100, and a second portion of the diagnostic system may be off-board the aircraft 100. The diagnostic system and method of the embodiments described herein may be implemented to monitor hydraulic pumps on existing aircraft and new aircraft. The system and method may be used with various types of aircraft that have hydraulic systems. Example types may include passenger aircraft, military aircraft, cargo aircraft, drones, or the like.

Figure 2:
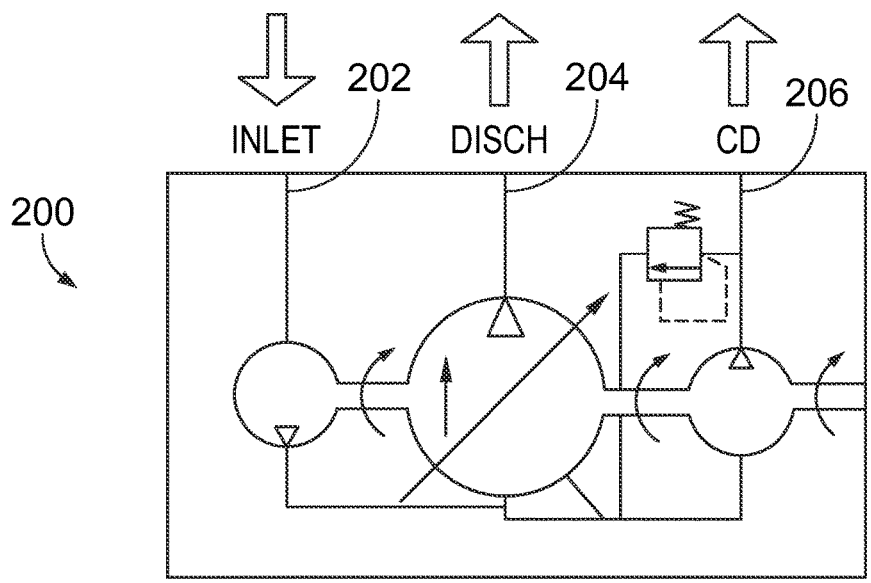
FIG. 2 is a schematic illustration of a hydraulic pump.

FIG. 2 is a schematic illustration of a hydraulic pump 200. The hydraulic pump 200 may be monitored by the diagnostic system and method described in the embodiments herein. The hydraulic pump 200 includes an inlet 202 and two outlets 204, 206. The two outlets are referred to as a discharge outlet 204 and a case drain outlet 206. In operation, the hydraulic pump 200 receives a low pressure stream of hydraulic fluid via the inlet 202. The hydraulic fluid may be received from a reservoir. The hydraulic pump 200 compresses the hydraulic fluid. The work performed on the hydraulic fluid generates heat due at least in part to internal leakage and friction in the hydraulic pump 200. Fluid flow and heat exit the pump through the outlets 204, 206. For example, a high pressure flow stream of the hydraulic fluid may be delivered from the discharge outlet 204. The high pressure flow stream may be directed to a hydraulic load on the aircraft. A second stream of hydraulic fluid may exit the hydraulic pump 200 through the case drain outlet 206. The second stream is referred to herein as a cooling flow stream. The hydraulic fluid in the cooling flow stream is discrete from the hydraulic fluid in the high pressure flow stream and may have a lower pressure than the high pressure flow stream. The hydraulic fluid that enters the hydraulic pump 200 through the inlet 202 gets distributed between the cooling flow stream and the high pressure flow stream. The cooling flow stream may be used to cool additional system components, electric motors, gearboxes, or electronics, before being directed back to the reservoir.

The amount of waste heat rejected into the high pressure flow stream may vary relative to the waste heat rejected into the cooling flow stream depending on flight conditions of the aircraft. For example, at a cruise state, when the aircraft is flying at relatively steady altitude and speed and there is little if any flight control activity requiring hydraulic fluid, most of the waste heat generated by the pump is rejected into the cooling flow stream that is emitted through the case drain outlet 206.

Figure 3:
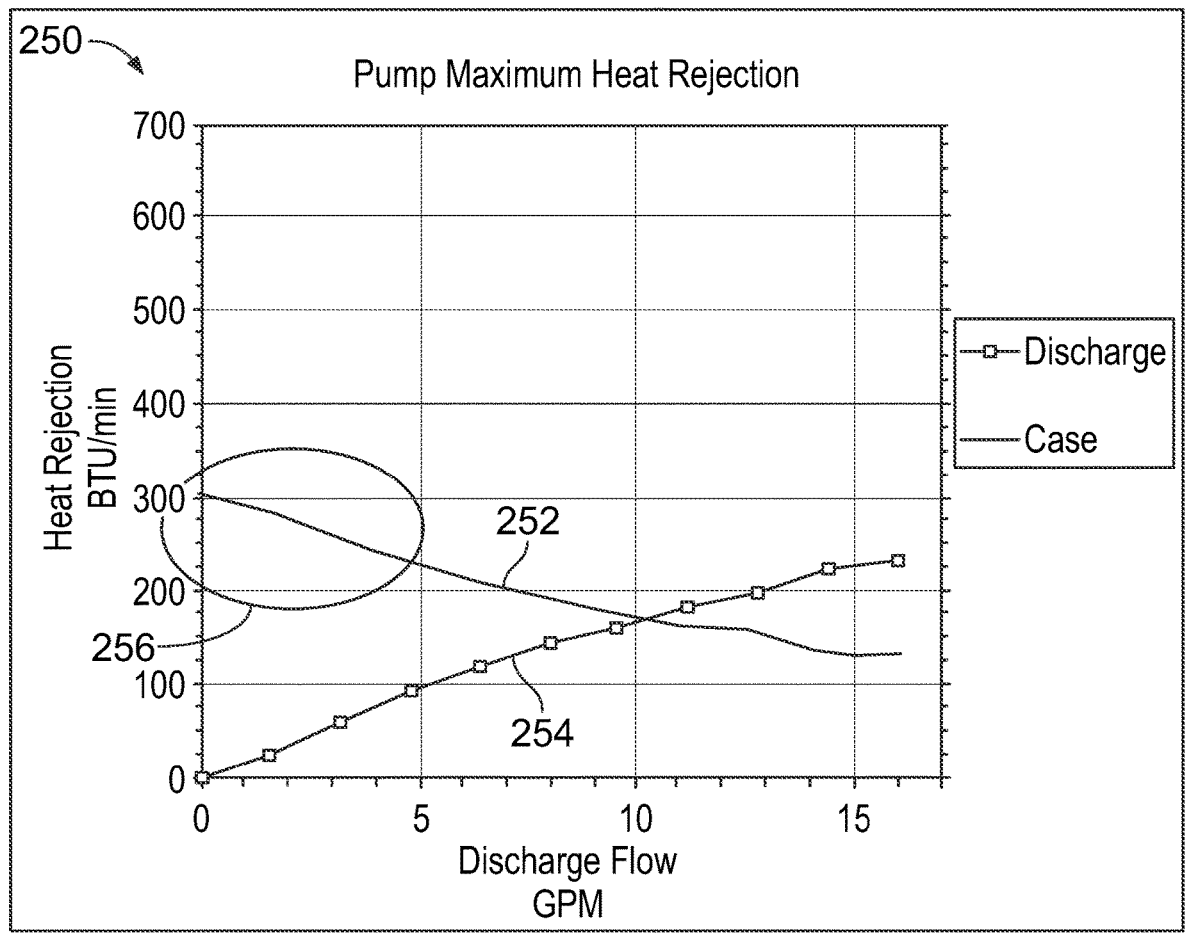
FIG. 3 is a graph reflecting heat rejection of a pump relative to a flow rate of high pressure flow stream through the discharge outlet.

FIG. 3 is a graph 250 reflecting heat rejection of a pump relative to a flow rate of high pressure flow stream through the discharge outlet 204. A first line 252 represents heat rejection through the case drain outlet 206 into the cooling flow stream (also referred to herein as case drain stream), and a second line 254 represents heat rejection through the discharge outlet 204 into the high pressure flow stream (also referred to herein as discharge stream). The data in the graph 250 may be based on various factors including the type of pump, the inlet fluid temperature, and the speed (e.g., RPM) of the pump. The graph 250 shows an inverse relationship between the heat rejection into the discharge stream 254 and the case drain stream 252. At low discharge flow rates, most of the waste heat is rejected into the case drain stream 252. For example, approximately all (e.g., at least 90%, at least 95%, or the like) of the waste heat is rejected into the case drain stream 252 when the discharge flow rate is less than 1 gallon per minute (GPM). As the flow rate of the discharge stream 254 increases, the amount of heat rejection into the discharge stream 254 increases, and the amount of heat rejection into the case drain stream 252 proportionately decreases. For example, at a discharge flow rate of about 10 GPM in the graph 250, the heat rejection into the two streams 252, 254 is approximately equal. More waste heat is rejected into the discharge stream 254 than the case drain stream 252 at discharge flow rates above 10 GPM. Although the data in FIG. 3 may be specific to a particular type of pump at a specific fluid inlet temperature and pump speed, the inverse trend shown in the graph 250 may be common to other pump types, fluid inlet temperatures, pump speeds, and/or the like.

In one or more embodiments, the temperature of the cooling flow stream is measured to determine a temperature rise across the hydraulic pump 200. Relevant temperature measurements for pump monitoring may occur at low hydraulic activity conditions of a flight. A low hydraulic activity condition may represent a condition in which there is little or no pilot control inputs that require hydraulic system activity. One example is when the aircraft is operating at a cruise state, flying with relatively constant altitude, speed, and direction. An elliptical indicator 256 in FIG. 3 highlights the case drain stream 252 at the low hydraulic activity condition. As indicated in the graph 250, most of the waste heat (e.g., at least 70%, at least 75%, at least 80%, at least 90%, or the like of total waste heat) generated by the pump is rejected to the case drain stream 252 when in the low hydraulic activity condition. The system and method described herein may measure the temperature of the case drain (or cooling flow) stream while the aircraft is in the low hydraulic activity condition. Because it is assumed based on the inverse trend shown in FIG. 3 that little or no heat is rejected into the discharge stream 254 at this condition, the temperature of the case drain stream can be used to determine total heat generated by the pump.

In one or more embodiments, only the temperature of the case drain stream 252 is monitored while the aircraft is in the low hydraulic activity condition. The temperature of the high pressure discharge stream 254 may not be measured, so there is no need for a temperature sensor along the high pressure flow stream downstream of the pump. Furthermore, temperatures of the case drain stream 252 when the aircraft is not in the low hydraulic activity condition may not be used to monitor the condition or health of the pump. The diagnostic system and method may monitor the health of the pump only in certain flight conditions, such as the low hydraulic activity condition. In another example, there may be a second flight condition of the aircraft in which it is determined that the pump is rejecting waste heat to both the discharge stream 254 and the case drain stream 252 at a determined proportion. In that case, the temperature of the case drain stream 252 can be measured while the aircraft is in the second flight condition and used, with the known proportional allocation, to determine the total heat generated by the pump. For example, if the second flight condition is associated with approximately equal heat rejection to both streams 252, 254, then the diagnostic system may use that proportional allocation with the measured temperature of the case drain stream 252 to determine the total heat generated by the pump.

In an embodiment, the diagnostic system may avoid the use of flow meters to directly measure hydraulic flow into and/or from the hydraulic pump 200. The diagnostic system may avoid the cost and weight of adding such devices. The diagnostic system described herein may indirectly estimate hydraulic flow and/or proportional allocation of waste heat based on particular flight conditions, pump speeds, and/or the like. For example, by determining that the aircraft is in a cruise state or another low hydraulic activity state highlighted by the indicator 256 in FIG. 3, the diagnostic system can assume that a substantial majority of the waste heat is rejected to the case drain stream 252 without measuring the temperature of the discharge stream 254. In an alternative embodiment, the diagnostic system may measure the flow rate of the discharge stream 254 and/or the case drain stream 252 using a flow meter, and use the measured flow rate with the graph 250 to determine the waste heat rejection into the streams 252, 254, or at least the proportional allocation of heat between the two streams 252, 254.

Figure 4:
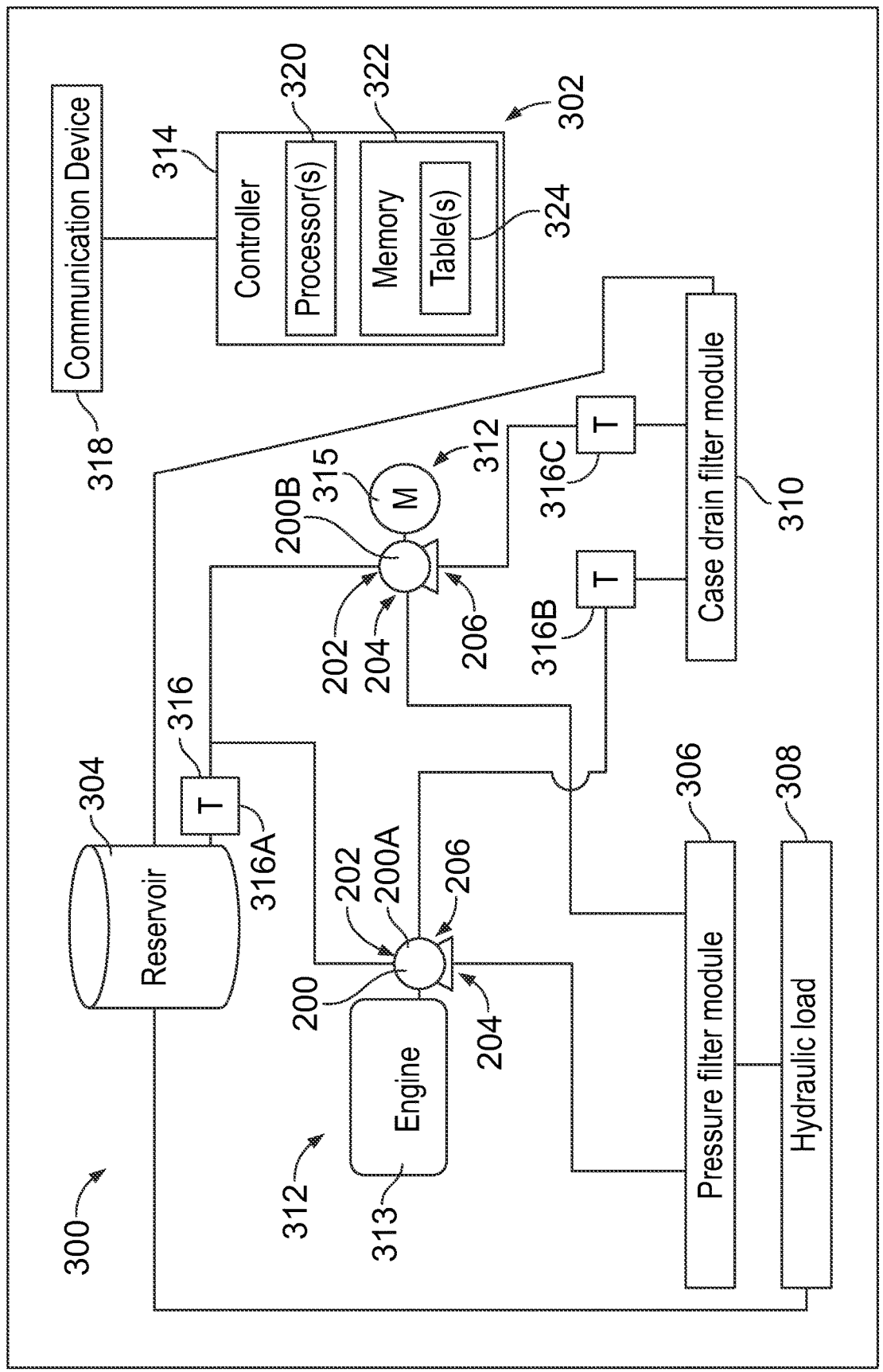
FIG. 4 is a block diagram showing a hydraulic system and a diagnostic system that monitors the health or condition of one or more hydraulic pumps of the hydraulic system according to an embodiment.

FIG. 4 is a block diagram showing a hydraulic system 300 and a diagnostic system 302 that monitors the health or condition of one or more hydraulic pumps 200 of the hydraulic system 300 according to an embodiment. The diagnostic system 302 is designed to provide early detection of hydraulic pumps 200 that are degraded, prior to those hydraulic pumps 200 actually failing (e.g., triggering a fault, exceeding an overheat threshold temperature, or the like). The hydraulic system 300 is disposed onboard an aircraft, such as the aircraft 100 in FIG. 1.

The hydraulic system 300 includes a reservoir 304 that contains hydraulic fluid, one or more hydraulic pumps 200, a pressure filter module 306, a hydraulic load 308, a case drain filter module 310, and various conduits, valves, and the like for providing closed flow paths for conveying the hydraulic fluid between the components. The hydraulic pump(s) 200 deliver hydraulic fluid from the reservoir 304 to the hydraulic load 308. The hydraulic load 308 may include or represent mechanical devices that are actuated and moved to control movement of the aircraft. The hydraulic load 308 may include rudders, elevators, ailerons, spoilers, flaperons, thrust reversers, landing gears, and/or the like. The hydraulic system 300 includes a first pump 200A and a second pump 200B in the illustrated embodiment. The pressure filter module 306 and the case drain filter module 310 may include various devices for conditioning and/or regulating the hydraulic fluid. For example, the filter modules 306, 310 may each include one or more sensors, relief valves, check valves, ground hook-ups, heat exchangers, and/or the like. The first pump 200A may be a primary pump, and the second pump 200B may be a secondary pump. Each of the pumps 200A, 200B may have a respective inlet 202, discharge outlet 204, and case drain outlet 206 as described in FIG. 2. The hydraulic system may have only one hydraulic pump 200 or at least three hydraulic pumps 200 in other embodiments.

Each pump 200A, 200B is powered by a respective driver component 312. The driver component 312 powers the pump to compress the hydraulic fluid. The driver components 312 may include a fuel combustion engine, an electric motor, a ram air turbine, or the like. In the illustrated embodiment, the first pump 200A is powered by a fuel combustion engine 313 which represents the respective driver component 312, and the second pump 200B is powered by an electric motor 315 which represents the respective driver component 312.

The inlet 202 of each pump 200A, 200B is fluidly connected to the reservoir 304 via conduits. When operating, the pumps 200A, 200B draw hydraulic fluid from the reservoir 304 into the pumps 200A, 200B through the inlets 202. Each pump 200A, 200B compresses the hydraulic fluid and emit the hydraulic fluid as a high pressure flow stream from the discharge outlet 204 and cooling flow stream from the case drain outlet 206. The two streams are separate and discrete, and are delivered to different locations. Hydraulic fluid that is at the reservoir 304 and in the incoming flow stream between the reservoir 304 and the inlet 202 is referred to herein as upstream of a respective pump. Hydraulic fluid in the high pressure flow stream and the cooling flow stream is referred to as downstream of the respective pump. In the illustrated configuration, the high pressure flow streams (e.g., discharge streams) from the pumps 200A, 200B are delivered to the pressure filter module 306. The lower pressure cooling flow streams (e.g., case drain streams) from the pumps 200A, 200B are delivered to the case drain filter module 310. The case drain filter module 310 may include one or more heat exchangers for permitting the hydraulic fluid in the cooling flow stream to disperse heat from one or more aircraft components before returning to the reservoir 304. The pressure filter module 306 may condition and/or regulate the hydraulic fluid in the high pressure flow stream before the high pressure flow stream is delivered to the hydraulic load 308 to perform work. The work may involve moving a flight control surface, such as a rudder, elevator, aileron, flaperon, and/or the like, extending or retracting landing gears, extending or retracting thrust reversers, and/or the like. The hydraulic fluid of the high pressure flow stream may return to the reservoir 304 after the hydraulic load 308. Optionally, the hydraulic system 300 may include a return filter module downstream of the case drain filter module 310 and the hydraulic load 308. The return filter module may condition and/or regulate the hydraulic fluid that is recycled back to the reservoir 304.

The diagnostic system 302 may include a controller 314, multiple temperature sensors 316, and a communication device 318. The controller 314 is operably connected to the other components via wired and/or wireless communication links to permit the transmission of information in the form of signals. For example, the controller 314 may receive sensor signals generated by the temperature sensors 316. The sensor signals represent a measured temperature of the hydraulic fluid in the hydraulic system 300 at a location of the respective sensor 316. The controller 314 may generate control signals that are transmitted to the communication device 318 and/or other components to control operation of the communication device 318 and/or the other components. The diagnostic system 302 may have additional components that are not shown in FIG. 4, such as a user input/output device. In an alternative embodiment, the diagnostic system 302 may lack one or more of the components shown in FIG. 4.

The temperature sensors 316 may be integrated into the hydraulic system 300 and disposed at multiple spaced-apart locations in the hydraulic system 300. In the illustrated embodiment, a first temperature sensor 316A is disposed upstream of both pumps 200A, 200B. The first temperature sensor 316A measures a first temperature of the hydraulic fluid measured upstream of the pump inlets 202. The first temperature sensor 316A may be disposed at the reservoir 304 or along the conduit pathway that extends from the reservoir 304 towards the pumps 200A, 200B. The first temperature may represent a temperature of the hydraulic fluid in the reservoir 304. The first temperature is referred to herein as an upstream temperature. Each pump 200A, 200B has an associated temperature sensor 316 that is located downstream of the case drain outlet 206 of the respective pump 200A, 200B and measures a second temperature of the hydraulic fluid within the cooling flow stream. The second temperature is referred to herein as a downstream temperature. For example, a second temperature sensor 316B is located downstream of the first pump 200A. The second sensor 316B may be coupled to the first pump 200A at the case drain outlet 206 or disposed along the conduit pathway that extends from the case drain outlet 206 of the first pump 200A to the case drain filter module 310. A third temperature sensor 316C is located downstream of the second pump 200B. The third temperature sensor 316C may be coupled to the second pump 200B at the case drain outlet 206 or disposed along the conduit pathway that extends from the case drain outlet 206 of the second pump 200B to the case drain filter module 310. The temperature sensors 316 may be thermocouples, resistance temperature detectors (RTDs), thermistors, or semiconductor based integrated circuits (IC).

The controller 314 determines a temperature rise of the hydraulic fluid across a hydraulic pump 200 as a difference between the first, upstream temperature and the second, downstream temperature. For example, the controller 314 receives sensor signals generated by the temperature sensors 316A-C via wired or wireless communication pathways. The controller 314 determines a value of the temperature rise across the first pump 200A as the difference between the downstream temperature measured by the second temperature sensor 316B and the upstream temperature measured by the first temperature sensor 316A. The controller 314 determines a value of the temperature rise across the second pump 200B as the difference between the downstream temperature measured by the third temperature sensor 316C and the upstream temperature measured by the first temperature sensor 316A.

The controller 314 represents hardware circuitry that includes and/or is connected with one or more processors 320 (e.g., one or more microprocessors, integrated circuits, microcontrollers, field-programmable gate arrays, etc.). The controller 314 includes and/or is connected with a tangible and non-transitory, computer-readable memory storage device (e.g., data storage medium or device), referred to herein as memory 322. The memory 322 may store programmed instructions (e.g., software) that are executed by the one or more processors 320 to perform diagnostic health monitoring and maintenance scheduling operations described herein. The programmed instructions may include one or more algorithms stored in the memory 322 and utilized by the one or more processors 320. References herein to the controller 314 may refer to the one or more processors 320. The memory 322 may store databases of information utilized by the one or more processors 320 to determine whether a pump is operating in a degraded state and/or has failed. In an embodiment, the memory 322 stores one or more look-up tables 324 that list expected ranges of temperature rises across pumps for each of multiple different conditions, such as different speed ranges of the pumps and/or different ambient temperatures of the surrounding environment. The memory 322 may store additional information, such as various application program interfaces (APIs) that link to cloud hosting services, via the communication device 318, for accessing information from remote storage devices, such as servers.

The communication device 318 represents hardware circuitry that can wirelessly communicate electrical signals. For example, the communication device 318 can represent transceiving circuitry, one or more antennas, and the like. The transceiving circuitry may include a transceiver or a separate transmitter and receiver. The electrical signals can form data packets that in the aggregate represent messages. In an example, the communication device 318 may wirelessly communicate electrical signals as radio frequency (RF) signals. In another example, the communication device 318 may be a modem, router, or the like, that is connected to a network (e.g., the Internet). The communication device 318 may communicate messages that are generated by the controller of the diagnostic system. The messages sent by the communication device 318 may include maintenance messages and restriction messages, as described herein. The messages may be communicated remotely to devices that are off-board the aircraft. The communication device 318 may receive messages from off-board the aircraft, and forward the received messages to the controller 314 for analysis.

Figures 5, 6:
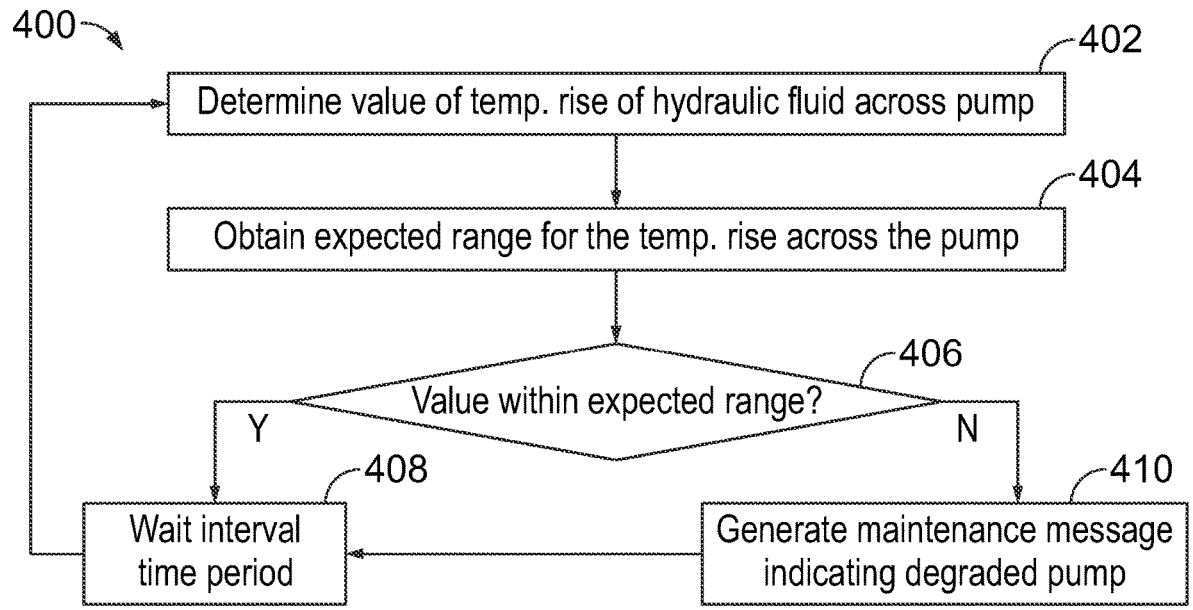
FIG. 5 is a flow chart of a method of monitoring a condition of a hydraulic pump according to an embodiment.
FIG. 6 is a table providing multiple expected ranges for the temperature rise across a pump for different corresponding pump speeds.

FIG. 5 is a flow chart 400 of a method of monitoring a condition of a hydraulic pump according to an embodiment. The method may be performed, at least in part, by the controller 314 of the diagnostic system 302 shown in FIG. 4. The method optionally may include at least one additional step than shown, at least one fewer step than shown, and/or at least one different step than shown in FIG. 5. The method may be performed to concurrently monitor multiple different pumps in a hydraulic system. For example, the method may be used to monitor both pumps 200A, 200B shown in FIG. 4.

At step 402, a value of a temperature rise of hydraulic fluid across a pump is determined. The controller 314 may determine the temperature rise of the hydraulic fluid across the first pump 200A by subtracting the upstream temperature measured by the first temperature sensor 316A from the downstream temperature measured by the second temperature sensor 316B. In an example, if the upstream temperature is 160° F., and the downstream temperature measured by the sensor 316B is 185° F., the controller 314 determines the value of the temperature rise across the first pump 200A to be 25° F. The method is described herein with reference to the first pump 200A, but the same steps can be applied to monitor the second pump 200B. For example, the value of the temperature rise across the second pump 200B can be determined by subtracting the upstream temperature measured by the first temperature sensor 316A from the downstream temperature measured by the third temperature sensor 316C, which is associated with the second pump 200B.

At step 404, an expected range for the temperature rise across the hydraulic pump 200 is obtained. The expected range represents a range that is expected to encompass the value of the temperature rise across the hydraulic pump 200 based on the type of pump and operating conditions, if the hydraulic pump 200 has a healthy (non-degraded) state. The expected range may be obtained based on the operating conditions experienced by the hydraulic pump 200. For example, different operating conditions affect the amount of waste heat rejected by the hydraulic pump 200 into the hydraulic fluid. The operating conditions include a speed of the hydraulic pump 200. In an embodiment, the controller may determine the speed of the hydraulic pump 200 indirectly based on a measured rotational speed of the driver component 312 that powers the hydraulic pump 200. For example, the controller may obtain a speed of the engine 313, and then determine the speed of the first pump 200A based on a known ratio (e.g., gear ratio) between the engine 313 and the hydraulic pump 200A. If the engine 313 is operating at 7000 rpm and the ratio of engine speed to pump speed is 2:1, then the controller 314 may determine the pump speed to be 3500 rpm. For other pumps, the pump speed may be determined based on the rotational speeds of the respective driver component, such as a motor speed, turbine speed, or other known indication of pump speed at the aircraft level. Alternatively, a sensor may be disposed on the hydraulic pump 200 to enable direct measurement of the pump speed.

In an embodiment, the controller 314 may obtain the expected range for the temperature rise by accessing the look-up table 324 stored in the memory storage device 322. FIG. 6 is a table 500 providing multiple expected ranges 502 for the temperature rise across a pump for different corresponding pump speeds 503. The table 500 may be one of the one or more look-up tables 324 stored in the memory 322. The table 500 lists a respective upper limit 504 of the expected range 502 and a respective lower limit 506 of the expected range 502 for each of multiple different ranges 508 of the speed 503 of the pump. For example, if the pump speed is determined to be 3500 rpm, then the expected range 502 of the temperature rise across the pump is from 12° F. to 22° F. This range means that the waste heat rejected by the hydraulic pump 200 into the cooling flow stream is expected to raise the temperature of the hydraulic fluid by 12 to 22° F.

Another operating condition that may affect the amount of waste heat rejected by the hydraulic pump 200 into the hydraulic fluid is the ambient temperature of the environment surrounding the aircraft, and more specifically the temperature at the reservoir 304 of the hydraulic system 300. For example, the viscosity of the hydraulic fluid changes based on the ambient temperature. The viscosity affects how the fluid flows through the pump and the amount of heat absorbed by the fluid. The table 500 in FIG. 6 is designed for reservoir temperatures that are from 20° F. to 80° F. Another factor is the size and type of the pump, as different types and sizes of pumps may generate different amounts of waste heat.

Another operating condition that may affect the heat rejection by the hydraulic pump 200 is flight condition. For example, as shown in the heat rejection graph in FIG. 3, the hydraulic pump 200 may reject heat through both the discharge outlet 204 and the case drain outlet 206 at different proportions for different flight conditions. Based on these different proportions, the amount of heat rejected into the cooling flow stream can differ between two different flight conditions, even if the total heat generated by the pump is constant. The table 500 in FIG. 6 may be specific to a particular flight condition. In an embodiment, the table 500 is designed for a low hydraulic activity state of the aircraft, such as while the aircraft is at cruise.

In an embodiment, the flight condition may be used as a triggering event to actively begin monitoring the temperature rise across the pump. For example, the method may include as an initial step, detecting a flight condition of the aircraft. One or more flight conditions may be detected based on the presence or absence of control signals received from a user input device that controls the movement of the aircraft. For example, the low hydraulic activity state (e.g., cruise state) can be detected in response to an absence of pilot control signals received from the user input device for at least a threshold period of time. If the hydraulic system has not received any pilot input control signals for over the threshold period of time (e.g., two minutes or the like), while other aircraft sensor data indicates that the aircraft is in flight at a relatively constant speed and elevation, then the controller 314 may detect that the aircraft is in the cruise state.

In an embodiment, the expected range of the temperature rise is based on little or no hydraulic activity conditions, so detecting that the aircraft is in the cruise state serves as a prerequisite before determining the value of the temperature rise at step 402. Stated more generically, the expected range of the temperature rise may be based on a particular flight condition, and the controller 314 may not begin monitoring the temperature rise across the hydraulic pump 200 until detecting that the aircraft is indeed in that particular flight condition. The value of the temperature rise is determined while the aircraft is in the flight condition on which the expected range is based. In the cruise state example, the controller 314 may not determine the value of the temperature rise across the hydraulic pump 200 until the controller 314 detects that the aircraft is in the cruise state. Furthermore, the controller 314 may only monitor the temperature rise across the hydraulic pump 200 while the aircraft is in the cruise state, such that the controller 314 does not continue to monitor the temperature rise once the flight condition switches from the cruise state.

In an embodiment, the table 500 in FIG. 6 may be one of multiple different tables 324 stored in the memory 322. The controller 314 may select which table to access and use to obtain the expected range based on the operating conditions. The operation conditions used to select the table may include the ambient temperature (e.g., the reservoir temperature), the type and size of the pump, the flight condition, and/or the like. The table 500 in FIG. 6 is specific to the cruise state and reservoir temperatures that are from 20° F. to 80° F. A second table may be for reservoir temperatures that are from 81° F. to 120° F. A third table and a fourth table may be similar to the first and second tables, but correspond to a different type and/or size of pump than the first and second tables. The values of the upper limits and lower limits of the expected ranges may vary slightly among the different tables.

The upper and lower limits 504, 506 in the look-up table 500 may be derived through calculation, modeling, or observing through experimentation. In an embodiment, the controller 314 may calculate the upper and lower limits 504, 506 for the expected ranges 502. The calculation may involve obtaining a volumetric flow rate of the hydraulic fluid based on the speed of the pump. Once the speed of the hydraulic pump 200 is determined, then the controller 314 may derive the volumetric flow rate of the cooling flow stream based on the pump speed and pump specifications (e.g., type and size). The flow rate may be a function of the pump speed, and may be specified by the pump manufacturer. For example, at 2000 rpm, the flow rate of the cooling flow stream may be 2.2 gpm within a designated margin. The controller 314 may then calculate a mass flow rate of the hydraulic fluid based on the volumetric flow rate and a density property of the hydraulic fluid. For example, the volumetric flow rate of the cooling flow stream may be multiplied by a density or specific gravity of the hydraulic fluid to determine the mass flow rate. If the volumetric flow rate is 4 gpm and the density is 8.2 lbs/gal, then the mass flow rate is calculated as 32.8 lbs/min. The controller 314 may then calculate both the upper limit of the expected range for the temperature rise and the lower limit of the expected range for the temperature rise based, at least in part, on the mass flow rate. For example, the controller 314 may plug the mass flow rate into thermal equations. The upper limit of the expected range may be calculated by dividing a maximum heat input for a given reservoir temperature range (in BTU/min) by a product of the specific heat of the hydraulic fluid and the mass flow rate (in lbs/min). The lower limit may be calculated by dividing a minimum heat input for a given reservoir temperature range (in BTU/min) by the product of the specific heat of the hydraulic fluid and the mass flow rate (in lbs/min). The maximum and minimum heat inputs may be determined from recorded heat rejection curves for different types and sizes of pumps at the given reservoir temperature range. In an embodiment, the controller 314 may generate the tables 324 stored in the memory 322 based on a series of these calculations.

In an alternative embodiment, rather than generate look-up tables and then access the look-up tables, the controller 314 may calculate the upper and lower limits of the expected range of the temperature rise on demand based on operating conditions that are monitored and stored data about the type and size of the pump.

Returning back to the flow chart 400 in FIG. 5, once the expected range is obtained, the controller 314 may compare the value of the temperature rise that is determined in step 402 to the expected range. At step 406, the controller 314 determines whether the value of the temperature rise (which represents the actual, measured temperature increase) of the hydraulic fluid is within the expected range. For example, if the value is 25° F. and the expected range is determined to be 16 to 25° F., then the value is determined to be within the expected range. The controller 314 may consider the ends of a range to qualify as being within the range. The value being within the expected range indicates that the hydraulic pump 200 is operating as expected. The pump may be classified as healthy (e.g., non-degraded). In this scenario, the flow of the method proceeds to step 408. At step 408, the controller 314 may wait for an interval time period before returning to step 402 to determine an updated value of the temperature rise across the pump. The interval time period may be on the order of seconds or minutes, such as 30 seconds, 1 minute, 2 minutes, 5 minutes, 15 minutes, or the like. The interval time period may be set by an operator or a default setting.

If, on the other hand, the expected range is determined at step 404 to be 12 to 22° F., then the value of 25° F. is determined to be outside of the expected range at step 406. The value being outside of the expected range indicates that the hydraulic pump 200 is not operating as expected. The hydraulic pump 200 may be classified as degraded or in a degraded state. Flow of the method may proceed to step 410, and the controller 314 may generate a maintenance message which indicates that the hydraulic pump 200 is operating in a degraded state. The maintenance message may identify the particular hydraulic pump 200 that is on the degraded state and may request scheduling or modifying a pre-scheduled maintenance appointment for the aircraft to address the degraded pump. The controller 314 may generate the maintenance message to be communicated by the communication device 318 to one or more devices that are off-board the aircraft. For example, the communication device 318 may transmit the maintenance message to a maintenance facility, to a personal device of a mechanic or other employee tasked with aircraft maintenance, to a server for cloud-based management of maintenance tickets, and/or the like. Optionally, the maintenance message may not be communicated to the pilot of the aircraft. For example, the maintenance message may be communicated to maintenance personnel, rather than pilots or other control personnel.

In an embodiment, the maintenance message may state that "pump A" has a higher than expected temperature rise. Optionally, the maintenance message may suggest a timeline for scheduling maintenance to repair or replace the pump. For example, the maintenance message may suggest scheduling a service appointment within 6 months. Optionally, the maintenance message may suggest operating conditions based on the degraded pump. For example, the maintenance message may state that continued operation of the aircraft is permissible without concern about the degraded pump as long as the ambient temperature is below 80° F. Optionally, the controller may tier the content of the maintenance message based on how far the measured value of the temperature rise is outside of the expected range. A larger discrepancy between the measured value and the expected range may indicate a greater severity of degradation of the pump. A pump with a greater severity of degradation may fail before a pump that has less severe degradation. In an embodiment, the maintenance message may suggest scheduling maintenance in a shorter timeframe for more severe degradation. For example, the controller 314 may suggest maintenance within one month if the measured value of the temperature rise is over 3 degrees outside of the expected range, and may suggest maintenance within 6 months if the measured value is less than 3 degrees outside of the expected range.

The method in FIG. 5 may also be used to monitor for fault or failures of the pumps. For example, the controller 314 may compare the measured value of the temperature rise across the hydraulic pump 200 to a designated overheat threshold. The upper limit 506 of the expected range 502 is below the designated overheat threshold. For example, the designated overheat threshold may be a 35° F. temperature rise. Alternatively, the designated overheat threshold may be a set temperature value to which the case drain temperature measurement is compared. In response to the value of the temperature rise (or the case drain temperature measurement) exceeding the designated overheat threshold, the controller 314 may determine that the hydraulic pump 200 is in a failed or fault state. The controller 314 may generate a restriction message that is more restrictive than the maintenance message. For example, the restriction message may be communicated to the pilot as well as to devices of an entity that operates the aircraft and devices of an entity that controls a flight network (e.g., FAA). The restriction message may prohibit subsequent flights of the aircraft until maintenance is performed on the aircraft to address the failed hydraulic pump 200.

In an embodiment, the controller 314 may perform trend analysis on the temperature data over time. For example, after determining the value of the temperature rise of the hydraulic fluid across the pump, the controller may determine multiple updated values of the temperature rise of the hydraulic fluid across the pump over an extended time period. The extended time period may extend over days, weeks, months, or years. The controller 314 may record the value and the updated values of the temperature rise in a database, such as in the memory 322 or in an off-board data storage device. The controller 314 may analyze the data over time to predict a remaining operational life of the pump based on a variation in the value and the updated values over the extended time period.

Figure 7:
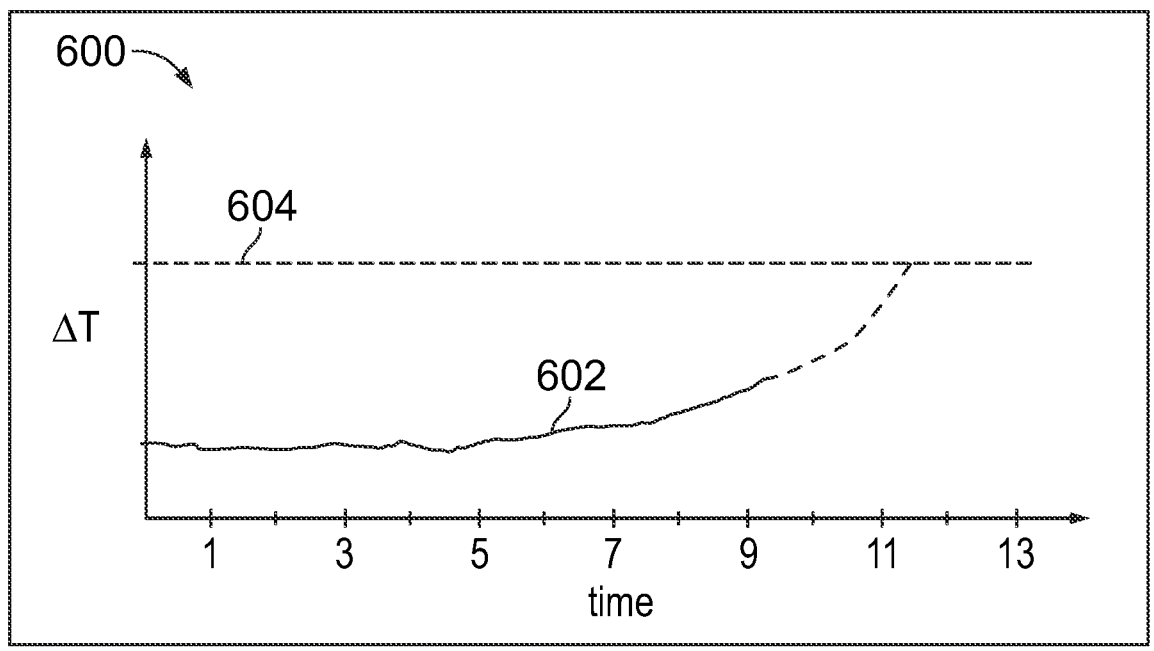
FIG. 7 is a graph depicting hydraulic fluid temperature rise values across a given pump over an extended time period according to an embodiment.

FIG. 7 is a graph 600 depicting hydraulic fluid temperature rise values across a given pump over an extended time period according to an embodiment. The horizontal axis depicts months of operational life of the pump. The trend line 602 is defined by hundreds or thousands of data points representing the measured temperature rise across the pump (e.g., as determined at step 402 in the method). The trend line 602 is relatively constant for the first five months and then begins to increase. The controller 314 may compare newer data points to older data points to determine a variation in the temperature rise over time. For example, the controller 314 may calculate a variation between the initial or baseline temperature rise within the first month of operation and the temperature rise values within the latest month of operation. The controller 314 may determine a slope of the trend line 602. The controller 314 may detect step changes and analyze the step changes, such as the magnitude and frequency of step changes.

The controller 314 may predict a remaining operational life of the pump based on the variation in the temperature rise values plotted in the trend line 602. For example, the controller 314 may extrapolate the trend line 602 to predict a time at which a future value of the temperature rise will exceed a designated overheat threshold 604 for the pump. In FIG. 7, the trend line 602 ends at month 9. The controller 314 may use the slope of the trend line 602 to predict a future segment 606 of the trend line 602. The controller 314 may determine, based on an intersection between the future segment 606 and the overheat threshold 604, a time in the future at which the future value of the temperature rise will exceed the overheat threshold for the pump. In FIG. 7, the future segment 606 intersects the overheat threshold 604 at about 11 months. The controller 314 may generate a maintenance message that states that the pump has an estimated two months of operational life remaining before failure. The estimated time before failure may be included as part of the maintenance message generated at step 410 of the method.

Clause 1: A diagnostic system comprising:
  a hydraulic system onboard an aircraft, the hydraulic system comprising a pump configured to pump hydraulic fluid from a reservoir to a hydraulic load on the aircraft;
  a first temperature sensor configured to measure a first temperature of the hydraulic fluid upstream of an inlet of the pump;
  a second temperature sensor configured to measure a second temperature of the hydraulic fluid within a cooling flow stream downstream of an outlet of the pump; and
  a controller including one or more processors and configured to:
    determine a value of a temperature rise of the hydraulic fluid across the pump as a difference between the first temperature and the second temperature;

obtain an expected range for the temperature rise of the hydraulic fluid across the pump based on a speed of the pump; and in response to the value of the temperature rise being outside of the expected range, generate a maintenance message for communication to one or more devices that are off-board the aircraft, wherein the maintenance message indicates that the pump is operating in a degraded state.

Clause 2: The diagnostic system of Clause 1, wherein the controller is further configured to:

obtain the expected range for the temperature rise based on a flight condition of the aircraft; and determine the value of the temperature rise while the aircraft is in the flight condition.

Clause 3: The diagnostic system of Clause 2, wherein the controller is configured to detect that the aircraft is in a cruise state as the flight condition.

Clause 4: The diagnostic system of any of Clauses 1-3, wherein the controller is further configured to obtain the expected range for the temperature rise based on an ambient temperature of an environment surrounding the aircraft.

Clause 5: The diagnostic system of any of Clauses 1-4, wherein the controller is further configured to generate the maintenance message to identify the pump and request scheduling a maintenance appointment for the aircraft.

Clause 6: The diagnostic system of any of Clauses 1-5, wherein the pump is powered by a driver component that is one of a fuel combustion engine, an electric motor, or a ram air turbine, and wherein the controller is configured to determine the speed of the pump based on a measured rotational speed of the driver component.

Clause 7: The diagnostic system of any of Clauses 1-6, wherein the outlet of the pump is a case drain outlet and the pump further includes a discharge outlet, the pump configured to deliver a high pressure flow stream of the hydraulic fluid from the discharge outlet to the hydraulic load on the aircraft, and wherein the hydraulic fluid in the high pressure flow stream is discrete from the hydraulic fluid in the cooling flow stream and has a greater pressure than the hydraulic fluid in the cooling flow stream.

Clause 8: The diagnostic system of any of Clauses 1-7, wherein the controller is configured to obtain the expected range by calculating the expected range, the controller configured to obtain a volumetric flow rate of the hydraulic fluid based on the speed of the pump, calculate a mass flow rate of the hydraulic fluid based on the volumetric flow rate and a density property of the hydraulic fluid, and calculate both an upper limit of the expected range for the temperature rise and a lower limit of the expected range for the temperature rise based, at least in part, on the mass flow rate.

Clause 9: The diagnostic system of any of Clauses 1-8, wherein the controller is configured to obtain the expected range by accessing a look-up table stored in a memory storage device, the look-up table listing a respective upper limit of the expected range and a respective lower limit of the expected range for each of multiple different ranges of the speed of the pump.

Clause 10: The diagnostic system of any of Clauses 1-9, wherein, after determining the value of the temperature rise of the hydraulic fluid across the pump, the controller is further configured to determine multiple updated values of the temperature rise of the hydraulic fluid across the pump over an extended time period and to record the value and the updated values.

Clause 11: The diagnostic system of Clause 10, wherein the controller is further configured to predict a remaining operational life of the pump based on a variation in the value and the updated values over the extended time period.

Clause 12: The diagnostic system of Clause 11, wherein the controller is further configured to predict the remaining operational life of the pump by extrapolating, based on the variation in the value and the updated values, a time at which a future value of the temperature rise will exceed a designated overheat threshold for the pump.

Clause 13: The diagnostic system of any of Clauses 1-12, wherein an upper limit of the expected range for the temperature rise is below a designated overheat threshold for the pump, wherein the controller is configured to generate a restriction message in response to the value of the temperature rise exceeding the designated overheat threshold, and wherein the restriction message prohibits subsequent flights of the aircraft until maintenance is performed on the aircraft to address the pump.

Clause 14: A method comprising:

determining a value of a temperature rise of hydraulic fluid across a pump of a hydraulic system onboard an aircraft, the temperature rise determined between a first temperature of the hydraulic fluid measured upstream of an inlet of the pump and a second temperature of the hydraulic fluid measured within a cooling flow stream downstream of an outlet of the pump;

obtaining an expected range for the temperature rise of the hydraulic fluid across the pump based on a speed of the pump; and in response to the value of the temperature rise being outside of the expected range, generating a maintenance message for communication to one or more devices that are off-board the aircraft, wherein the maintenance message indicates that the pump is operating in a degraded state.

Clause 15: The method of Clause 14, wherein the expected range for the temperature rise is based on a flight condition of the aircraft, and wherein the value of the temperature rise is determined while the aircraft is in the flight condition on which the expected range is based.

Clause 16: The method of Clause 15, further comprising detecting the flight condition of the aircraft based, at least in part, on control signals received from a user input device that controls movement of the aircraft.

Clause 17: The method of any of Clauses 14-16, wherein said obtaining the expected range of the temperature rise comprises accessing a look-up table stored in a memory storage device, and wherein the look-up table lists a respective upper limit of the expected range and a respective lower limit of the expected range for each of multiple different ranges of the speed of the pump.

Clause 18: The method of any of Clauses 14-17, wherein, after determining the value of the temperature rise of the hydraulic fluid across the pump, the method further comprises:

determining updated values of the temperature rise of the hydraulic fluid across the pump over an extended time period; and predicting a remaining operational life of the pump based on a variation in the value and the updated values over the extended time period.

Clause 19: The method of Clause 18, wherein said predicting the remaining life span comprises extrapolating, based on the variation in the value and the updated values, a time at which a future value of the temperature rise will exceed a designated overheat threshold for the pump.

Clause 20: A diagnostic system comprising:
a first temperature sensor configured to measure a first temperature of hydraulic fluid upstream of an inlet of a pump, the hydraulic fluid and the pump representing components of a hydraulic system onboard an aircraft, the pump configured to pump the hydraulic fluid from a reservoir to a hydraulic load on the aircraft;
a second temperature sensor configured to measure a second temperature of the hydraulic fluid within a cooling flow stream downstream of an outlet of the pump; and
a controller including one or more processors and configured to:
detect a flight condition of the aircraft based, at least in part, on an absence of control signals received from a user input device that controls movement of the aircraft;
determine a value of a temperature rise of the hydraulic fluid across the pump as a difference between the first temperature and the second temperature, wherein the value of the temperature rise is determined while the aircraft is in the flight condition that is detected;
obtain an expected range for the temperature rise of the hydraulic fluid across the pump based on the flight condition of the aircraft and a speed of the pump; and
in response to the value of the temperature rise being outside of the expected range, generate a maintenance message for communication to one or more devices that are off-board the aircraft, wherein the maintenance message identifies the pump, indicates that the pump is operating in a degraded state, and requests scheduling a maintenance appointment for the aircraft.

While various spatial and direction terms such as top, bottom, lower, mid, lateral, horizontal, vertical, front and the like can be used to describe embodiments of the present disclosure, it is understood that such terms are merely used with respect to the orientations shown in the drawings. The orientations can be inverted, rotated, or otherwise changed, such that an upper portion is a lower portion, and vice versa, horizontal becomes vertical, and the like.

As used herein, a structure, limitation, or element that is "configured to" perform a task or operation is particularly structurally formed, constructed, or adapted in a manner corresponding to the task or operation. For purposes of clarity and the avoidance of doubt, an object that is merely capable of being modified to perform the task or operation is not "configured to" perform the task or operation as used herein.

It is to be understood that the above description is intended to be illustrative, and not restrictive. For example, the above-described embodiments (and/or aspects thereof) can be used in combination with each other. In addition, many modifications can be made to adapt a particular situation or material to the teachings of the various embodiments of the disclosure without departing from their scope. While the dimensions and types of materials described herein are intended to define the parameters of the various embodiments of the disclosure, the embodiments are by no means limiting and are exemplary embodiments. Many other embodiments will be apparent to those of skill in the art upon reviewing the above description. The scope of the various embodiments of the disclosure should, therefore, be determined with reference to the appended claims, along with the full scope of equivalents to which such claims are entitled. In the appended claims and the detailed description herein, the terms "including" and "in which" are used as the plain-English equivalents of the respective terms "comprising" and "wherein." Moreover, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function void of further structure.

This written description uses examples to disclose the various embodiments of the disclosure, including the best mode, and also to enable any person skilled in the art to practice the various embodiments of the disclosure, including making and using any devices or systems and performing any incorporated methods. The patentable scope of the various embodiments of the disclosure is defined by the claims, and can include other examples that occur to those skilled in the art. Such other examples are intended to be within the scope of the claims if the examples have structural elements that do not differ from the literal language of the claims, or if the examples include equivalent structural elements with insubstantial differences from the literal language of the claims.

What is claimed is:

1. A diagnostic system comprising:
a hydraulic system onboard an aircraft, the hydraulic system comprising a pump configured to pump hydraulic fluid on the aircraft, the pump including an inlet, a discharge outlet, and a case drain outlet, wherein the inlet is fluidly connected to a reservoir and receives an incoming flow stream of the hydraulic fluid from the reservoir, the discharge outlet emits a high pressure flow stream of the hydraulic fluid configured to be conveyed to a hydraulic load to perform work, and the case drain outlet emits a cooling flow stream of the hydraulic fluid that is discrete from the high pressure flow stream, wherein the cooling flow stream has a lower pressure than the high pressure flow stream;
a first temperature sensor configured to measure a first temperature of the incoming flow stream upstream of the inlet of the pump;
a second temperature sensor configured to measure a second temperature of the cooling flow stream downstream of the case drain outlet of the pump; and
a controller including one or more processors and configured to:
determine a value of a temperature rise of the hydraulic fluid across the pump as a difference between the first temperature and the second temperature;
obtain an expected range for the temperature rise of the hydraulic fluid across the pump based on a speed of the pump; and
in response to the value of the temperature rise being outside of the expected range, generate a maintenance message for communication to one or more devices that are off-board the aircraft, wherein the maintenance message indicates that the pump is operating in a degraded state.

2. The diagnostic system of claim 1, wherein the controller is further configured to:
obtain the expected range for the temperature rise based on a flight condition of the aircraft; and
determine the value of the temperature rise while the aircraft is in the flight condition.

3. The diagnostic system of claim 2, wherein the controller is further configured to determine that the aircraft is in a cruise state as the flight condition.

4. The diagnostic system of claim 1, wherein the controller is further configured to obtain the expected range for the temperature rise based on an ambient temperature of an environment surrounding the aircraft.

5. The diagnostic system of claim 1, wherein the controller is further configured to generate the maintenance message to identify the pump and request scheduling a maintenance appointment for the aircraft.

6. The diagnostic system of claim 1, wherein the pump is powered by a driver component that is one of a fuel combustion engine, an electric motor, or a ram air turbine, and wherein the controller is configured to determine the speed of the pump based on a measured rotational speed of the driver component.

7. The diagnostic system of claim 1, wherein the controller is configured to obtain the expected range by calculating the expected range, the controller configured to obtain a volumetric flow rate of the hydraulic fluid based on the speed of the pump, calculate a mass flow rate of the hydraulic fluid based on the volumetric flow rate and a density property of the hydraulic fluid, and calculate both an upper limit of the expected range for the temperature rise and a lower limit of the expected range for the temperature rise based, at least in part, on the mass flow rate.

8. The diagnostic system of claim 1, wherein the controller is configured to obtain the expected range by accessing a look-up table stored in a memory storage device, the look-up table listing a respective upper limit of the expected range and a respective lower limit of the expected range for each of multiple different ranges of the speed of the pump.

9. The diagnostic system of claim 1, wherein, after determining the value of the temperature rise of the hydraulic fluid across the pump, the controller is further configured to determine multiple updated values of the temperature rise of the hydraulic fluid across the pump over an extended time period and to record the value and the updated values.

10. The diagnostic system of claim 9, wherein the controller is further configured to predict a remaining operational life of the pump based on a variation in the value and the updated values over the extended time period.

11. The diagnostic system of claim 10, wherein the controller is further configured to predict the remaining operational life of the pump by extrapolating, based on the variation in the value and the updated values, a time at which a future value of the temperature rise will exceed a designated overheat threshold for the pump.

12. The diagnostic system of claim 1, wherein an upper limit of the expected range for the temperature rise is below a designated overheat threshold for the pump, wherein the controller is configured to generate a restriction message in response to the value of the temperature rise exceeding the designated overheat threshold, and wherein the restriction message prohibits subsequent flights of the aircraft until maintenance is performed on the aircraft to address the pump.

13. A method comprising:
providing a hydraulic system that includes a pump configured to pump hydraulic fluid on an aircraft, the pump including an inlet, a discharge outlet, and a case drain outlet, wherein the inlet is fluidly connected to a reservoir and receives an incoming flow stream of the hydraulic fluid from the reservoir, the discharge outlet emits a high pressure flow stream of the hydraulic fluid configured to be conveyed to a hydraulic load to perform work, and the case drain outlet emits a cooling flow stream of the hydraulic fluid that is discrete from the high pressure flow stream, wherein the cooling flow stream has a lower pressure than the high pressure flow stream;

receiving a first sensor signal, generated by a first temperature sensor located upstream of the inlet of the pump, indicating a temperature of the incoming flow stream;

receiving a second sensor signal, generated by a second temperature sensor located downstream of the case drain outlet of the pump, indicating a temperature of the cooling flow stream;

determining a value of a temperature rise of the hydraulic fluid across the pump of the hydraulic system as a difference between the temperature of the incoming flow stream and the temperature of the cooling flow stream;

obtaining an expected range for the temperature rise of the hydraulic fluid across the pump based on a speed of the pump; and in response to the value of the temperature rise being outside of the expected range, generating a maintenance message for communication to one or more devices that are off-board the aircraft, wherein the maintenance message indicates that the pump is operating in a degraded state.

14. The method of claim 13, wherein the expected range for the temperature rise is based on a flight condition of the aircraft, and wherein the value of the temperature rise is determined while the aircraft is in the flight condition on which the expected range is based.

15. The method of claim 14, further comprising determining the flight condition of the aircraft based, at least in part, on control signals received from a user input device that controls movement of the aircraft.

16. The method of claim 13, wherein said obtaining the expected range of the temperature rise comprises accessing a look-up table stored in a memory storage device, and wherein the look-up table lists a respective upper limit of the expected range and a respective lower limit of the expected range for each of multiple different ranges of the speed of the pump.

17. The method of claim 13, wherein, after determining the value of the temperature rise of the hydraulic fluid across the pump, the method further comprises:
determining updated values of the temperature rise of the hydraulic fluid across the pump over an extended time period; and
predicting a remaining operational life of the pump based on a variation in the value and the updated values over the extended time period.

18. The method of claim 17, wherein said predicting the remaining life span comprises extrapolating, based on the variation in the value and the updated values, a time at which a future value of the temperature rise will exceed a designated overheat threshold for the pump.

19. A diagnostic system comprising:
a pump of a hydraulic system, the pump including an inlet, a discharge outlet, and a case drain outlet, wherein the inlet is fluidly connected to a reservoir and receives an incoming flow stream of hydraulic fluid from the reservoir, the discharge outlet emits a high pressure flow stream of the hydraulic fluid configured to be conveyed to a hydraulic load to perform work, and the case drain outlet emits a cooling flow stream of the hydraulic fluid that is discrete from the high pressure flow stream, wherein the cooling flow stream has a lower pressure than the high pressure flow stream;
a first temperature sensor configured to measure a first temperature of the incoming flow stream upstream of the inlet of the pump;
a second temperature sensor configured to measure a second temperature of the cooling flow stream downstream of the case drain outlet of the pump; and
a controller including one or more processors and configured to:
  determine a flight condition of the aircraft based, at least in part, on an absence of control signals received from a user input device that controls movement of the aircraft;
  determine a value of a temperature rise of the hydraulic fluid across the pump as a difference between the first temperature and the second temperature, wherein the value of the temperature rise is determined while the aircraft is in the flight condition that is determined;
  obtain an expected range for the temperature rise of the hydraulic fluid across the pump based on the flight condition of the aircraft and a speed of the pump; and
  in response to the value of the temperature rise being outside of the expected range, generate a maintenance message for communication to one or more devices that are off-board the aircraft, wherein the maintenance message identifies the pump, indicates that the pump is operating in a degraded state, and requests scheduling a maintenance appointment for the aircraft.

20. The diagnostic system of claim 19, wherein the controller is configured to determine that the aircraft is in cruise mode as the flight condition, and is configured to obtain the expected range for the temperature rise of the hydraulic fluid across the pump based on the aircraft being in the cruise mode.

\* \* \* \* \*